United States Patent [19]

Igashira et al.

[11] Patent Number: 4,465,050

[45] Date of Patent: Aug. 14, 1984

[54] DEVICE FOR ATOMIZING THE FUEL FOR AN INTERNAL-COMBUSTION ENGINE

[75] Inventors: Toshihiko Igashira, Toyokawa; Michihiro Ohashi, Handa; Hisasi Kawai, Toyohashi; Ken Nomura, Okazaki; Mitiaki Ujihashi, Mishima; Minoru Iwata, Susono, all of Japan

[73] Assignees: Nippon Soken, Inc., Nishio; Toyota Jidosha Kogyo Kabushiki Kaisha, Toyota, both of Japan

[21] Appl. No.: 379,495

[22] Filed: May 18, 1982

[30] Foreign Application Priority Data

May 19, 1981 [JP] Japan .................................. 56-74101
May 22, 1981 [JP] Japan .................................. 56-76740

[51] Int. Cl.³ .............................................. F02B 3/00
[52] U.S. Cl. ..................................... 123/472; 123/533; 123/531; 123/585; 123/586
[58] Field of Search ............... 123/533, 531, 472, 585, 123/586, 471, 478

[56] References Cited

U.S. PATENT DOCUMENTS

| | | | |
|---|---|---|---|
| 1,871,115 | 8/1932 | Cowardin et al. | 123/533 |
| 2,164,684 | 7/1939 | Kimmel | 123/533 |
| 2,482,864 | 9/1949 | Nemnich | 123/533 |
| 4,235,209 | 11/1980 | Ibbott | 123/586 |
| 4,289,104 | 9/1981 | Takada | 123/471 |

Primary Examiner—Ronald B. Cox
Attorney, Agent, or Firm—Cushman, Darby & Cushman

[57] ABSTRACT

A device for atomizing the fuel for an internal-combustion engine comprising a fuel pump, an electromagnetic fuel-injection valve connected to said fuel pump, an air-injection port adjoining the injection port of said electromagnetic fuel-injection valve, an electromagnetic air flow-controlling valve connected to said air-injection port, and an air pump for feeding air to said air flow-controlling valve, wherein said air flow-controlling valve is controlled in such a manner that the injection of air from said air-injection port takes place simultaneously with the injection of fuel from said fuel-injection valve, whereby the air pump and the driving circuit thereof are of a comparatively small size and the amount of power necessary for driving the air pump is of comparatively small.

10 Claims, 9 Drawing Figures

DEVICE FOR ATOMIZING THE FUEL FOR AN INTERNAL-COMBUSTION ENGINE

BACKGROUND OF THE INVENTION

1. Field of the Invention

The present invention relates to a device to atomizing the fuel for an internal-combustion engine.

2. Description of the Prior Art

An internal-combustion engine having a fuel-supply system which has an electromagnetic fuel injection valve and intermittently injects liquid fuel into an air-intake manifold at low pressure generally has difficulty in promoting the atomization of fuel so as to improve combustion and the quality of exhaust.

In order to promote the atomization of fuel, air is injected into the air-intake manifold so as to collide the air with the injected fuel.

A conventional air-supply method utilizes the difference in the pressure of the open air and the pressure in the air-intake manifold. In this method, there is a defect in that a sufficient supply of air cannot be obtained if there is a decreasing pressure difference between the pressure of the open air and the pressure in the air-intake manifold when the throttle valve is opened wider. In order to improve this defect, there is another method in which an air pump is used. The method in which an air pump is used can improve the above-mentioned defect. However, the method has two disadvantages. One disadvantage is that a large air pump is required, and the other disadvantage is that a comparatively high power is required to drive the air pump.

According to an investigation made by the inventors of the present invention, in the case of the electromagnetic fuel-injection system, used in passenger cars presently on the market which have a four-cylinder engine and a cylinder volume of 1,600 cubic centimeters, air having at least a flow rate of 100 liters per minute and a pressure of 1 kg/cm$^2$ is necessary to sufficiently atomize the fuel. In this case, the output power of the air pump must be at least 163 watts and therefore a comparatively high power is required to drive the pump.

The electronic control-type fuel-injection system used in the present invention is described, for example, in the new automobile instructions manual of TOYOTA CRESTA, pages 80 through 101, published in April 1980.

The present invention is proposed in order to overcome the above-mentioned disadvantages.

SUMMARY OF THE INVENTION

The principal object of the present invention is to provide a device for atomizing the fuel for an internal-combustion engine which only requires a comparatively small air pump and a comparatively small air pump driving circuit and in which the power sufficient for driving the air pump is comparatively small.

According to one aspect of the present invention, there is provided a device for atomizing the fuel for an internal-combustion engine comprising a fuel pump, an electromagnetic fuel-injection valve connected to said fuel pump, an air-injection port adjoining the injection port of said electromagnetic fuel-injection valve, an electromagnetic air flow-controlling valve connected to said air-injection port, and an air pump for feeding air to said air flow-controlling valve, wherein said air flow-controlling valve is controlled in such a manner that the injection of air from said air-injection port takes place simultaneously with the injection of fuel from said fuel-injection valve.

According to another aspect of the present invention, there is provided a device for atomizing the fuel for an internal-combustion engine comprising a fuel pump, an electromagnetic fuel-injection valve connected to said fuel pump, an air-injection port adjoining the injection port of said electromagnetic fuel-injection valve, an electromagnetic air flow-controlling valve connected to said air-injection port, an air pump for feeding air into said air flow-controlling valve, a means for detecting the amount of air taken in, a pressure-accumulating vessel located between said air pump and said air flow-controlling valve, a computer circuit for producing a signal corresponding to the amount of air taken in, and an electric motor-control circuit responsive to the signal produced in said computer circuit for producing the signal for controlling the motor for driving said air pump, whereby the driving power of said air pump is controlled in accordance with the amount of air taken in.

According to still another aspect of the present invention, there is provided a device for atomizing the fuel for an internal-combustion engine comprising a fuel pump, an electromagnetic fuel-injection valve connected to said fuel pump, an air-injection port adjoining the injection port of said electromagnetic fuel-injection valve, an electromagnetic air flow-controlling valve connected to said air-injection port, an air pump for feeding air to said air flow-controlling valve, a means for detecting the amount of air taken in, a pressure-accumulating vessel located between said air pump and said air flow-controlling valve, a computer circuit for producing a signal corresponding to the amount of air taken in, and an electric motor-control circuit responsive to the signal produced in said computer circuit for producing the signal for controlling the motor for driving said air pump, wherein said internal-combustion engine further comprises a means for detecting the pressure vaue in said pressure-accummulating vessel, whereby the driving power of said air pump is controlled in accordance with the high or low of the ratio of a predetermined value to said detecting pressure value by said detection means.

DESCRIPTION OF THE PREFERRED EMBODIMENTS

Figure 1:
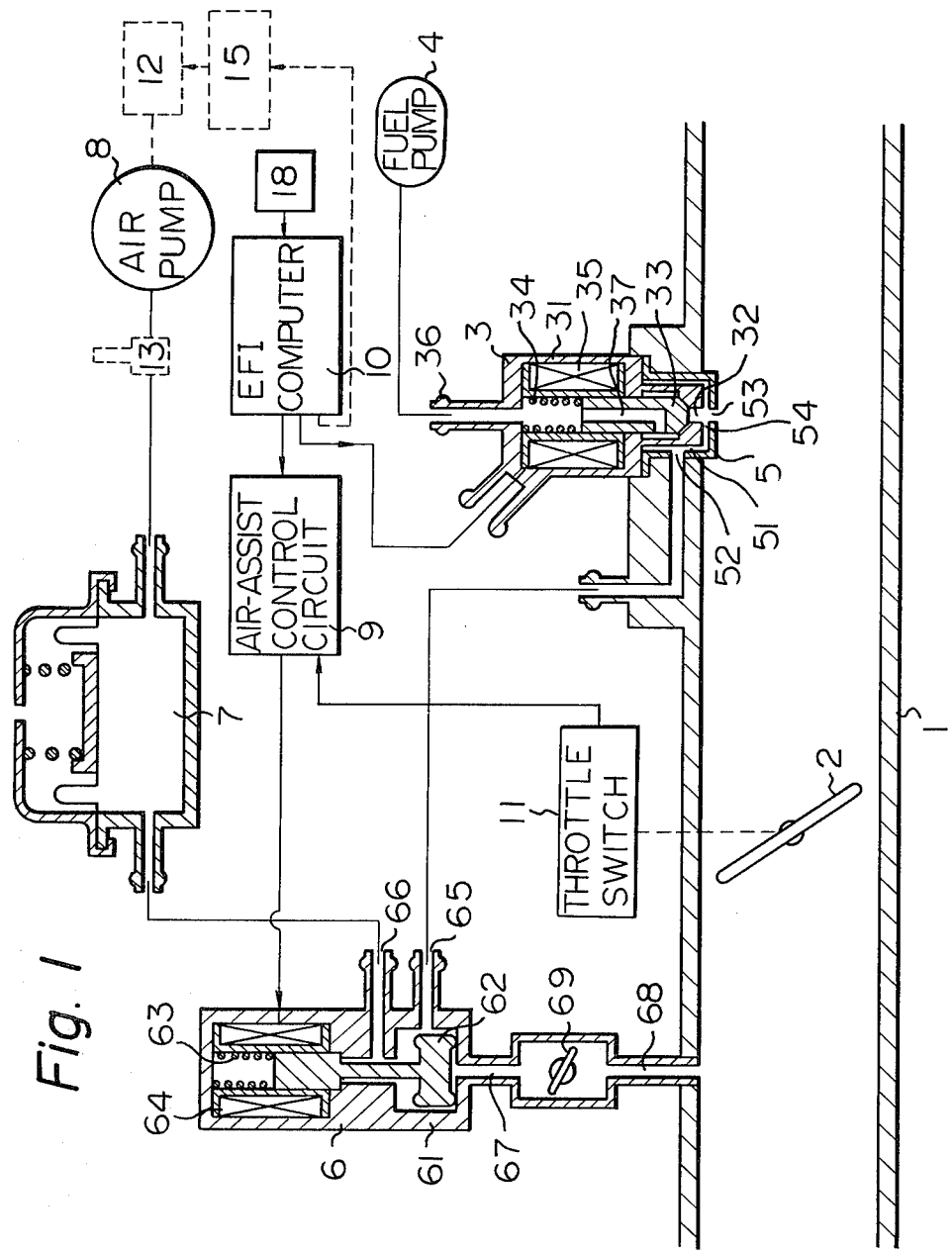
FIG. 1 is a schematic diagram showing the constitution of a device for atomizing the fuel for an internal-combustion engine according to an embodiment and a modified example thereof in the present invention.

In FIG. 1 the schematic constitution of a device for atomizing the fuel for an internal-combustion engine is shown according to an embodiment of the present invention.

The device comprises an intake manifold 1 and a throttle valve 2. Upstream (left side of the figure) of the throttle valve 2, the intake manifold 1 opens to the air through an air cleaner, and downstream of the throttle valve 2 (right side of the figure) the intake manifold leads to a cylinder of the internal-combustion engine. Downstream of the throttle valve 2 in the intake manifold 1, a fuel-injection valve 3 is located. The fuel injection valve 3 comprises a casing 31, a fuel-injection port 32 provided on the casing 31, a valve body 33 for opening or closing the fuel-injection port 32, a spring 34 for pushing the valve body 33 toward the fuel-injection port 32 and for closing the fuel-injection port 32, and a solenoid 35 for opening the fuel-injection port 32 by lifting the valve body 33.

The fuel is sent under pressure from a fuel pump 4, is conducted into the casing 31 through a nipple 36 provided on the casing 31 of the fuel-injection valve 3, is passed through the center of the solenoid 35 and through a passage 37 provided at the center portion of the valve body 33, and is supplied into the intake manifold 1 through the fuel-injection port 32 only when the valve body 33 is lifted. On the outside of the fuel-injection port 32, an air-assist (air assistant for atomizing the fuel) cap 5 having a small gap 51 is located. The air is conducted into the gap 51 between the air-assist cap 5 and the fuel-injection valve 3 through an air-intake port 52 located next to the air-assist cap 5.

A two-fluid (air-fuel mixture) injection port 53 is located at the extended portion of the fuel-injection port 32 of the end of the air-assist cap 5. The annular aperture made of the gap 51 surrounding the fuel-injection port 32 is an air-injection port 54. The fuel injected from the fuel-injection port 32 and the air injected from the air-injection port 54 are mixed when they collide with each other and are injected into the intake manifold 1 from the two-fluid injection port 53, enabling the fuel to be sufficiently atomized with the aid of the air.

The air supplied to the air-assist cap 5 is controlled by an electromagnetic three-way valve 6. The electromagnetic three-way valve 6 is already publicly known and comprises a casing 61, a valve body 62, a spring 63, and a solenoid 64. The casing 61 has three apertures. The apertures 65 leads to the air-assist cap 5, the aperture 66 leads to an accummulator 7, and the aperture 67 leads to the upstream of the throttle valve 2 in the intake manifold 1.

When electric power is applied to the solenoid 64, the air-assist cap 5 is conducted to the portion of the upstream of the throttle valve 2 in the intake manifold 1, and when electric power is not applied to the solenoid 64, the air-assist cap 5 leads to the accumulator 7. In a passage 68 connecting the aperture 67 with the air-intake manifold 1, an air-adjusting valve 69 is located, and when the throttle valve 2 is completely closed, namely when the engine is idling, the air-adjusting valve 69 is adjusted so that all of the necessary amount of air in the internal-combustion engine passes through the air-adjusting valve 69.

The air-adjusting valve 69 may be either the fixed type or the adjusting type using a servomechanism to maintain the appropriate idling rotation frequency if the air-adjusting valve 69 can be adjusted so that the rotation frequency when the internal-combustion engine is idling is the appropriate value.

A publicly known accumulator having any construction can be used as the accumulator 7. The accumulator 7 is supplied with air from an air pump 8. A publicly known air pump also can be used as the air pump 8. In the air pump 8, when the vomiting pressure rises more than 1 kg/cm$^2$, either a relief valve is operated or the operation of the air pump stops.

The electromagnetic three-way valve 6 is controlled by an air-assist control circuit 9. The fuel-injection valve 3 is controlled by an electronically controlled-fuel injection (EFI) computer 10. The EFI computer 10 is on the market and is publicly known.

The command signals (battery voltage 12 volts) to the fuel-injection valve 3 from the EFI computer 10 are transmitted through the air-assist control circuit 9. The air-assist control circuit 9 stops supplying electric power to the electromagnetic three-way valve 6 at the same time that the supply of electric power to the fuel-injection valve 3 is begun, and 1 millisecond after the supply of electric power to the fuel-injection valve 3 is stopped, the supply of electric power to the electromagnetic three-way valve 6 is begun.

A throttle switch 11 for detecting complete closing of the throttle valve 2 is provided near the throttle valve 2. When the throttle valve 2 is completely closed, the throttle switch 11 is in the ON state and the air-assist control circuit 9 does not stop supplying electric power to the electromagnetic three-way valve 6.

The EFI (electronic-controlled fuel injection) system is generally known. For example, the EFI system is described in the new automobile instructions manual of TOYOTA CRESTA, pages 80 through 101, published in April 1980. Therefore, in order to explain the EFI computer 10 and the fuel injection-valve 3 regarding the present invention, the present invention is explained with reference to a fuel-injection valve attached to an air-injection port. Therefore, various sensor devices which are necessary for the EFI system are not described.

Figure 2:
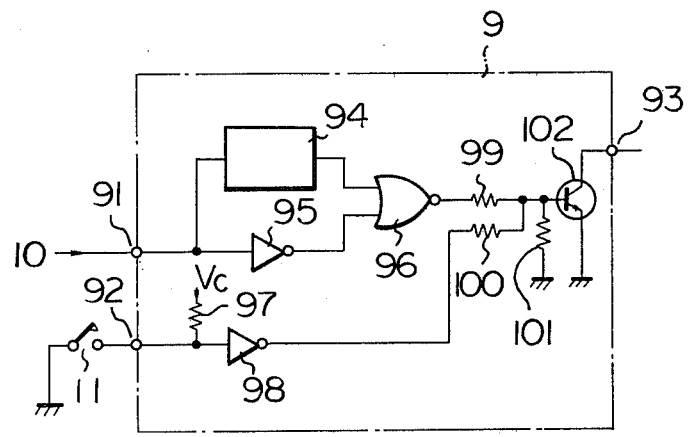
FIG. 2 is a diagram showing the internal constitution of an air-assist (air assistant for atomizing the fuel) control circuit used for the device in FIG. 1.

The output of the EFI computer 10 drives the fuel-injection valve 3 so that the fuel is injected. In FIG. 2, a diagram illustrating the internal constitution of the air-assist control circuit 9 is shown. The first input terminal 91 in the air-assist control circuit 9 is connected to the output of the EFI computer 10, and at the inner side of the circuit the first input terminal 91 is connected to the input of a mono-stable multivibrator 94 and one input of a NOR gate 96 through an inverter 95. The output of the mono-stable multivibrator 94 is connected to the other input of the NOR gate 96. One terminal of the throttle switch 11 is grounded, and the other terminal is connectd to an input terminal 92 of the air-assist control circuit 9. The input terminal 92 is connected to the input of an inverter 98. Voltage Vc is applied to one terminal of a resistor 97 and the other terminal is connected to the input of the inverter 98. The output of the NOR gate 96 is connected to the base of a transistor 102 through a resistor 99, and the output of the inverter 98 is similarly connected to the base of the transistor 102 through a resistor 100. The emitter of the transistor 102 is grounded, and a resistor 101 is inserted between the base of the transistor 102 and the ground. The collector of the transistor 102 is connected to one terminal of the coil 64 of the electromagnetic three-way valve 6 through an output terminal 93 of the air-assist control circuit 9. The other terminal of the coil 64 of the electromagnetic three-way valve 6 is connected to a power source which is not shown in the figure.

Figure 3:
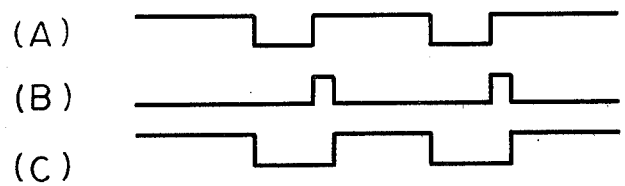
FIG. 3 is a wave form diagram illustrating the operation of the air-assist control circuit in FIG. 2.

The operation of the air-assist control circuit 9 is explained below. When the throttle switch 11 is in the ON state, the output of the inverter 98 is at a high level, and whatever value the output of the NOR gate 96 is the transistor 102 is in the ON state, the electromagnetic three-way valve 6 is in the attracting state, the air from the accumulator 7 is shut off, and the air from the air-adjusting valve 69 is conducted to the air-assist cap 5. When the throttle switch 11 is in the OFF state, the output of the inverter 98 is at a low level, and the transistor 102 is controlled by the output of the NOR gate 96. When the throttle switch 11 is in the OFF state, the output from the EFI computer 10 is supplied to the input of the mono-stable multivibrator 94, and at the output of the mono-stable multivibrator 94, pulses having a pulse width of 1 millisecond are generated as shown in FIG. 3 (B). The wave form of the output pulse of the EFI computer 10 is shown in FIG. 3 (A). Therefore, at the output of the NOR gate 96, the output wave form is as shown in FIG. 3 (C). In FIG. 3, the abscissa indicates the passage of time and the ordinate indicates the voltage. When the output of the NOR gate 96 is at a low level, the transistor 102 is in the OFF state, the electromagnetic three-way valve 6 is in the OFF state, and the air from the accumulator 7 is conducted into the electromagnetic three-way valve 6. When the output of the NOR gate 96 is at a high level, the transistor 102 is in the ON state, and the air from the air-adjusting valve 69 is conducted into the electromagnetic three-way valve 6.

An example of the operation is explained according to the above-mentioned embodiment of the present invention.

When an internal-combustion engine having four cylinders and a cylinder volume of 1,600 cubic centimeter is operated at a medium speed and medium load, for example when it is operating at a rotation speed of 2,000 revolutions per minute and the negative pressure in the intake manifold is 31997 Pa (240 mmHg), the fuel-injection valve 3 is opened once per revolution for approximately 5 milliseconds, and then the fuel is injected. The opening of the fuel-injection valve 3 is carried out with the energizing of the solenoid 35 through the EFI computer 10, while the air-assist control circuit 9 stops the energizing of the solenoid 64 in the three-way valve 6 as soon as the air assist-control circuit 9 detects the energizing of the solenoid 35. As a result, the aperture 65 is conducted to the aperture 66, the air stored in the accumulator 7 having a pressure of 1 kg/cm$^2$ (736 mmHg) is injected at the speed of sound from the air-injection port 54 with a pressure difference of 130122 Pa (976 mmHg), and simultaneously the air is injected from the two-fluid injection port 53 into the intake manifold 1 and collides and mixes with the fuel injected from the fuel-injection port 32.

Since the aperture area of the air-injection port 54 is designated so that the flow rate becomes 1,000 liters per minute at the moment when the above-mentioned injection takes place, the fuel can be sufficiently atomized. After the lapse of 5 milliseconds, the solenoid 35 is de-energized by the EFI computer 10. The air-assist control circuit 9 detects the de-energizing of the solenoid 35 and then energizes the solenoid 64 in the three-way valve 6, 1 millisecond later after the de-energization of the solenoid 35. As a result, the aperture 65 is conducted to the aperture 67, so that the air from upstream of the throttle valve 2 is injected from the air-injection port 54 with a pressure difference of 31997 Pa (240 mmHg). The speed of the above-mentioned injected fluid is considerably less than the speed of sound, and the amount of air is no longer sufficient to atomize the fuel in the above-mentioned case. However, by this time the injection of fuel has stopped, and therefore there is no problem because the injection of fuel usually stops completely within 1 millisecond after the energizing of the fuel-injection valve 3 is stopped. In this condition the output power of the pump 8 is 33 watts. If the electromagnetic three-way valve 6 is not used, the output power of the pump 8 is 163 watts; thus an 80 percent decrease in power is possible.

When said internal-combustion engine is operating at a rotation speed of 2,000 revolutions per minute and the negative pressure in the intake manifold is 4,000 Pa (30 mmHg), the so-called full load condition, the fuel-injection valve 3 is opened once per rotation of the engine for 8 milliseconds, and thus the fuel is injected. In the above-mentioned condition, the energizing of the three-way valve 6 is stopped for 9 milliseconds, and during this time the air from the accumulator 7, having a pressure of 1 kg/cm$^2$, is injected at the speed of sound through the air-injection port 54. In this condition, the output power of the pump 8 is 49 watts, a 70 percent decrease in power is possible compared with the power of 163 watts in the case in which no three-way valve 6 is used. Although air is supplied to the air-injection port 54 from upstream of the throttle valve 2 while electric power is supplied to the three-way valve 6, the supplied pressure is only 4000 Pa (30 mmHg) and the amount of air is small.

When the internal-combustion engine is idling, accordingly the throttle valve 2 is completely closed, the air-assist control circuit 9 supplies electric power to the three-way valve 6 continuously after receiving a signal from the throttle switch 11, and the energizing of the three-way valve 6 is not stopped. Therefore, the air upstream of the throttle valve 2 is supplied to the air-injection port 54. In this condition, because the throttle valve 2 is entirely closed, the air which is necessary for idling of the internal-combustion engine is completely supplied through the air-injection port 54.

During idling, the negative pressure of the intake manifold 1 is usually 66661 Pa (500 mmHg). If the air-adjusting valve 69 is in the completely open state, the air is supplied at the speed of sound from the air-injection port 54 and the amount of air is 100 liters per minute. When the amount of air is in excess of the amount necessary for the right idling rotation, the air-adjusting valve 69 closes after the necessary amount of air is supplied, so that the amount of air becomes the necessary amount; thus, the amount of air is decreased. In this case, the air pump 8 does not need to be operated and therefore remains off.

In the above-mentioned embodiment, although the engine has four cylinders, it is described as if the engine has a fuel-injection valve. This is done to simplify the description; of course, each cylinder may be provided with a fuel-injection valve, respectively, and in such a case, a manifold may extend from the aperture 65 of the three-way valve 6 to each air-injection port.

Further, in the above-mentioned embodiment, the air supplied to the air pump 8 is explained as being supplied from the open air. However, instead of this method, the air may be supplied to the air pump 8 from upstream of the throttle valve 2 in the intake manifold. Particularly, when an internal-combustion engine having a supercharger is used, the air must be supplied from downstream of the supercharger.

Further, in the above-mentioned embodiment, when the air pump 8 operates the relief valve or stops operating, the pressure of the air pump 8 becomes no less than 1 kg/cm$^2$. Since the pressure value is determined so that the speed of the air injected from the air-injection port becomes the speed of sound and the amount of air is always stable, when the pressure in the intake manifold is at a low value, said predetermined pressure value may be set at a lower value corresponding to the pressure in the intake manifold.

Further, in the above-mentioned embodiment, when complete closing of the throttle valve is detected, the supply of air from the air pump to the air injection port is stopped. Said control may be changed to a type of control by which when the negative pressure detected at downstream of the throttle valve, for example, is higher than the pressure value of 53329 Pa (400 mmHg), the supply of air from the air pump to the air-injection port does not take place. The reason for changing the type of control is that when the air is supplied from the open air to a portion having a negative pressure of no less than 47996 Pa (360 mmHg), the speed of the air is the speed of sound and the amount of air supplied does not change in spite of the use of the air pump.

Further, when the difference in time between the time at which actual operation of the fuel-injecting valve 3 begins and the time at which actual operation of the air flow-controlling valve 6 begins after the solenoid of the fuel-injecting valve 3 and the solenoid of the air flow-controlling valve 6 are simultaneously energized is very great, the energizing time and de-energizing time must be shifted so that the actual operations of opening and closing the valves take place simultaneously. Also, the difference in time between the time of fuel injection and the time of air injection cannot be disregarded because the distance between the air flow-controlling valve 6 and the position of the air-injection port 54 is long, and therefore the time required to energize and de-energize the air flow-controlling valve 6 must be compensated for by early opening of the air flow-controlling valve 6.

In the above-mentioned device according to the embodiment of the present invention, control of the valves is simple because both the controlling valve controlling the air supplied from the air pump and the fuel injection valve have an electromagnetic valve and the two valves are opened by only one signal. Also, since the air conducted from the open air is supplied to the same air-injection port while the air supplied from the air pump is cut off, if the fuel is present near the air-injection port, the device can atomize the fuel. Further, if the idling rotation frequency in the internal-combustion engine is adjusted according to the amount of air conducted into the air-injection port from the open air, the idling rotation is not interfered with because while the engine is idling the supply of air from the air pump is stopped.

For embodying the present invention, besides the above-mentioned embodiment, various modified embodiments can be carried out.

One modified embodiment of a device for atomizing the fuel for an internal-combustion engine is shown in FIG. 1, especially with reference to the portions indicated by the broken lines. Except for the items mentioned hereinafter, this modified embodiment is the same as the above-mentioned embodiment. In this modified embodiment, an air pump 8 is, for example, a vane pump which is publicly know and is driven coaxially by an electric motor 12 which is controlled by the EFI computer 10 through an electric motor control circuit 15. The electric motor 12 is publicly known, for example, to be a direct current series-wound motor. A relief valve 13 is provided at the output side of the air pump 8, and is opened with a pressure of 1 kg/cm$^2$.

The electric motor control circuit 15 receives an input signal from the EFI computer 10 corresponding to the amount of air taken in and supplies the electric motor 12 with electric power corresponding to the input signal.

In such an extreme case in which the speed of rotation of the electric motor 12 decreases excessively and the electric motor 12 stops, the electric motor 12 is supplied with a constant small amount of electric power in accordance with the amount of air taken in, which is less than the predetermined value, because the responsive characteristic of the motor 12 worsens.

In the EFI computer 10, after a signal from a sensor 18 indicating that the amount of air taken in was converted from analog to digital (A-D), the converted signal is stored in the random access memory (RAM) in a micro computer. The converted signal is converted to a binary code corresponding to the amount of air taken in. The binary code output which is A-D converted is supplied to the direct current electric motor control circuit 15.

Figure 4:
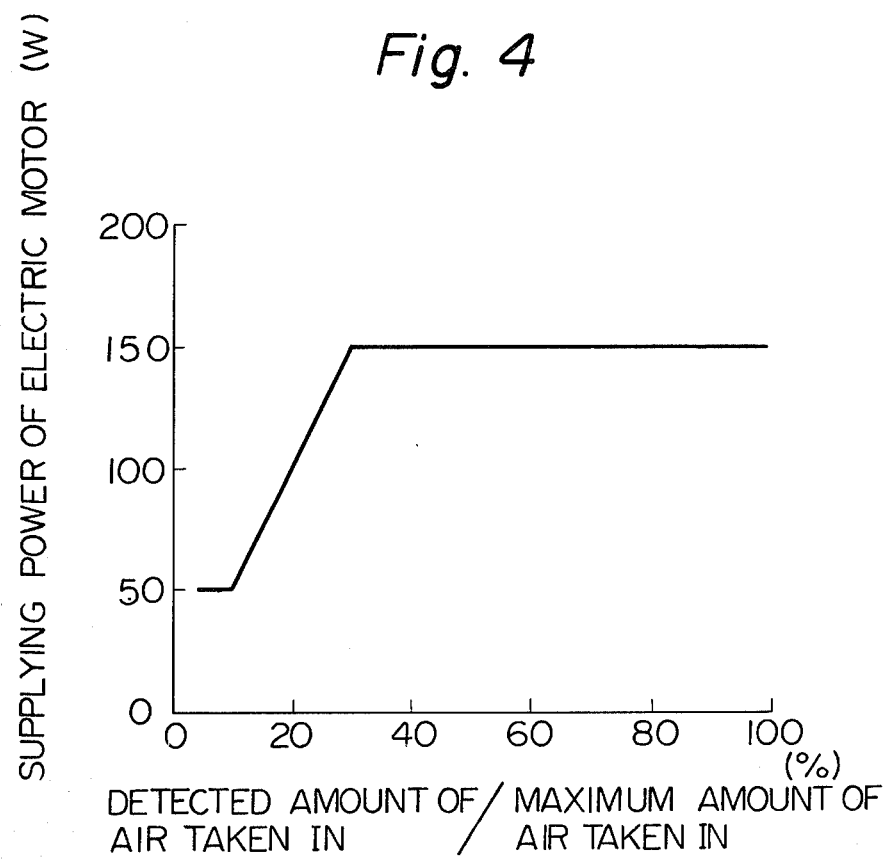
FIG. 4 is a graph showing the relation between the detected amount of air taken in and the supply of electric power for the electric motor in the device of FIG. 1.
Figure 5:
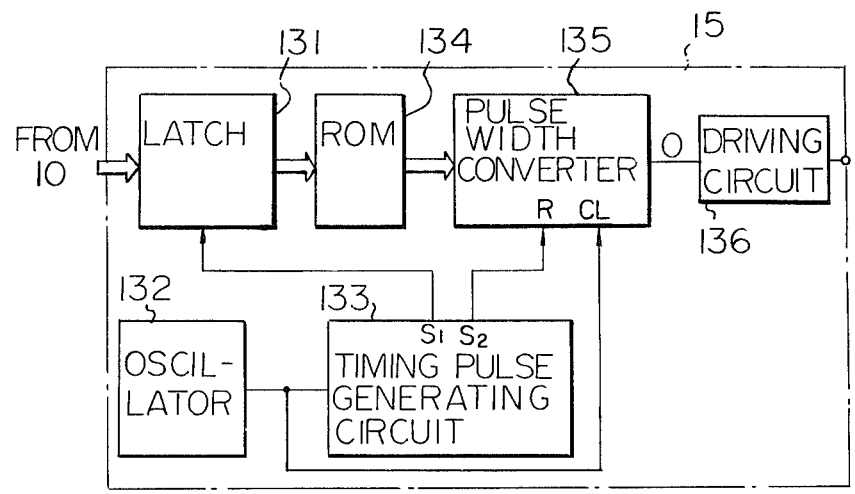
FIG. 5 is a block circuit diagram showing the constitution of the electric motor-control circuit in the device of FIG. 1.

The electric motor control circuit 15 is explained below with reference to the block diagram of FIG. 5. A latch circuit 131 is a temporary memory circuit constituted of an 8-bit memory using two elements, which elements are product model number 4035 made by Radio corporation of America. The latch circuit 131 receives the binary code corresponding to the amount of air taken in from the EFI computer 10 when an S$_1$ pulse from a timing pulse-generating circuit 133 (described later) is applied, memorizes, and supplies the output. A read-only memory (ROM) 134 is programmed in such a manner that when the output of the latch circuit 131 is applied as an address, the output of the ROM is supplied with a value corresponding to the supplying power of the electric motor in FIG. 4. In this example, the power control method of the direct current electric motor 12 uses a duty control of the applied wave form, the frequency of which is constantly approximately 500 herz. Therefore, the duty control can be performed by determining the ON time or OFF time of the motor. In FIG. 4, the electric power and the ON time of the direct current electric motor 12 are approximately proportional, and accordingly the ON time can be determined if the electric power of the motor corresponding to the ON time is previously measured. Also, the relationship between the above-mentioned amount Q of air taken in and the binary code applied to the input of the latch circuit 131 is not a proportional function relationship but a logarithmic function relationship, which is a single valued function. Therefore, the ROM 134 may be previously programmed so that the ON time of the direct current electric motor 12 is generated as a binary code output receiving a final input binary code of the latch circuit 131 as a ROM 134 address. The ROM 134 has an input of 8 bits and an output of 8 bits.

An oscillator 132 generates pulses having a certain frequency. A timing pulse-generating circuit 133 consists of a frequency divider circuit and a logic circuit and generates $S_1$ pulses having the wave form shown in FIG. 6 (L) and $S_2$ pulses having the wave form shown in FIG. 6 (M). The $S_1$ pulse is supplied to the clock input of the latch circuit 131 and the $S_2$ pulse is supplied to the reset input of a pulse width converter 135.

Figure 6:
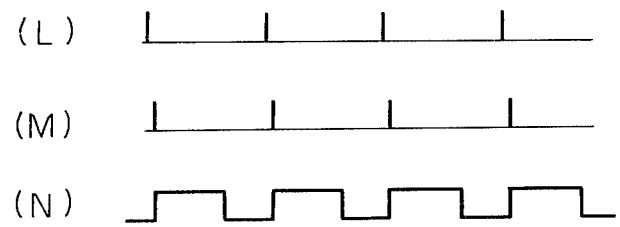
FIG. 6 is a wave form diagram illustrating the operation of the electric motor-control circuit in FIG. 5.

The pulse width converter 135 comprises a comparator (product model number CD 4063 made by Radio corporation of America), a counter, and a logic circuit. The pulse width converter 135 is reset by the $S_2$ pulse from the timing pulse-generating circuit 133 and then initiates counting. When the coincidence between the binary code output value and the above-mentioned counting value is obtained, the output of the pulse width converter 135 changes to a low level and supplies the wave form of FIG. 6 (N). In FIGS. 6 (L), (M) and (N) the abscissa indicates the time and the ordinate indicates the voltage. The output of the pulse width converter 135 is connected to a driving circuit 136. The driving circuit 136 amplifies the power of the output signal from the pulse width converter 135, and the output of the driving circuit 136 drives the direct current electric motor 12.

A summary of the above-mentioned explanations is given below. The electric motor control circuit 15 memorizes the binary code of the amount of air taken in Q from the EFI computer 10 and the memorized binary code is applied as an address for the ROM. Then the value corresponding to the supplying power of the electric motor which corresponds to the amount of air taken in Q in FIG. 4, namely corresponding to the ON time of the duty factor of the wave form, is read dout from the previously programmed ROM, and the value is converted to the pulse width. Then the direct current electric motor 12 is controlled by means of the duty factor control method.

In this modified embodiment, the EFI computer 10 supplies the value of the amount of air taken in Q as the digital value. However, in the case of using an analog control EFI computer, the obtained analog voltage value indicating the amount of air taken in may be supplied to the latch circuit 131 in the electric motor control circuit 15 through the A-D converter.

The operation of the above-mentioned modified embodiment is described below.

When the internal-combustion engine is operated at a medium speed and medium load, for example, the rotation speed is 2,000 revolution per minute (the required time for one revolution is 30 milliseconds) and the value of the negative pressure in the intake manihold is 32000 Pa (240 mmHg), the amount of air taken in is 20 percent of the maximum air taken in. In this condition, the fuel-injection valve 3 opens once per revolution for approximately 5 milliseconds at a command signal from the EFI computer 10. At this time, the fuel is injected. The air-assist control circuit 9 which detects the signal of the valve opening immediately stops the energizing for the electromagnetic three-way valve 6. As a result, the aperture 66 is opened, the air having a pressure of 1 kg/cm$^2$ stored in the accumulator 7 is injected at a speed of 100 liters per minute from the air-injection port 54, and the fuel is atomized when it collides with and is mixed with the injected air.

The fuel-injection valve 3 is closed 5 milliseconds after opening. The air-assist control circuit 9 detecting the closing signal of the fuel-injection valve 3, after a lapse of 1 millisecond, again supplies electric power to the electromagnetic three-way valve 6. As a result, the aperture 66 is closed. At this time, the theoretical power by which the air is supplied for fuel atomizing is 33 watts. However, in consideration of efficiency, the electric motor control circuit 15 supplies a power of 100 watts to the electric motor 12.

When the above-mentioned internal-combustion engine is rotating at a speed of 2,000 revolutions per minute, namely a full load, the amount of air taken in becomes 30 percent of the maximum amount of air taken in. At this time, the fuel-injection valve 3 is opened for approximately 8 milliseconds per revolution at a command signal from the EFI computer 10, and during that time the fuel is injected. In response to the operation of the fuel-injection valve 3, the air-assist control circuit 9 stops the supply of power to the electromagnetic three-way valve 6 for 9 milliseconds. At this time, the theoretical power by which the air is supplied for fuel atomizing is 49 watts. However, in consideration of efficiency, the electric motor control circuit 15 supplies a power of 150 watts to the electric motor 12.

When the above-mentioned internal-combustion engine is operating at a high speed and heavy load and the amount of air taken in becomes more than 30 percent of the maximum amount of air taken in, the electric motor 12 needs to supply of power of more than 150 watts in order to maintain an air-flow speed of 100 liter per minute which is supplied in the previous condition, i.e., the high and heavy load operation. However, a power exceeding 150 watts is not supplied because the rated power of the electric motor 12 is 150 watts. As a result, although the flow speed of the air decreases at a high speed and heavy load and fuel atomizing is slightly unfavorable, since the engine does not continue to operate at a high speed and heavy load for a long time, there is no problem.

When the above-mentioned internal-combustion engine is idling, i.e., the throttle valve is completely closed, the air-assist control circuit 9 supplies power continuously to the electromagnetic three-way valve 6 in accordance with the signal from the throttle switch 11. Therefore, the air from upstream of the throttle valve 2 is supplied to the air-injection port 54. In this case, the air stored in the accumulator 7 is not used at all. However, a power of 50 watts is supplied to the electric motor 12, and thus the electric motor 12 does not stop and all of the air injected from the air pump 8 is released from the relief valve 13.

In FIG. 4 the relationship between the above-explained ratio of the detected amount of air taken in to the maximum amount of air taken in and the electric power supplied to the electric motor 12 is illustrated. According to FIG. 4, it seems that the saturating range in which power is supplied to the electric motor 12, i.e. 150 watts, is excessively wide. However, in the usual operating condition of the internal-combustion engine, there is no problem because the above-mentioned air amount ratio scarcely exceeds the value of 30 percent.

A device for atomizing the fuel for an internal-combustion engine according to another modified embodiment of the present invention is explained with reference to FIG. 7. This modified embodiment differs from the aforementioned modified embodiment in FIG. 1 is the following ways:

(1) In the accumulator 7, a pressure sensor 16 is provided. The pressure sensor 16 detects the pressure value in the accumulator 7 and supplies the pressure value to an electric motor control circuit 17.

(2) The signal from the EFI computer 10 indicating the amount of air taken in is not supplied to the electric motor control circuit 17. The difference between the detecting pressure value at the pressure sensor 16 and the predetermined pressure value, for example 1 kg/cm$^2$, is detected, and the electric power which is proportional to the above different value is supplied to the electric motor 12. In this case, similarly with the modified embodiment in FIG. 1, if the detected pressure value identifies with the predetermined pressure value, a constant, small amount of electric power is supplied to the electric motor 12 so that the electric motor 12 does not stop.

Figure 7:
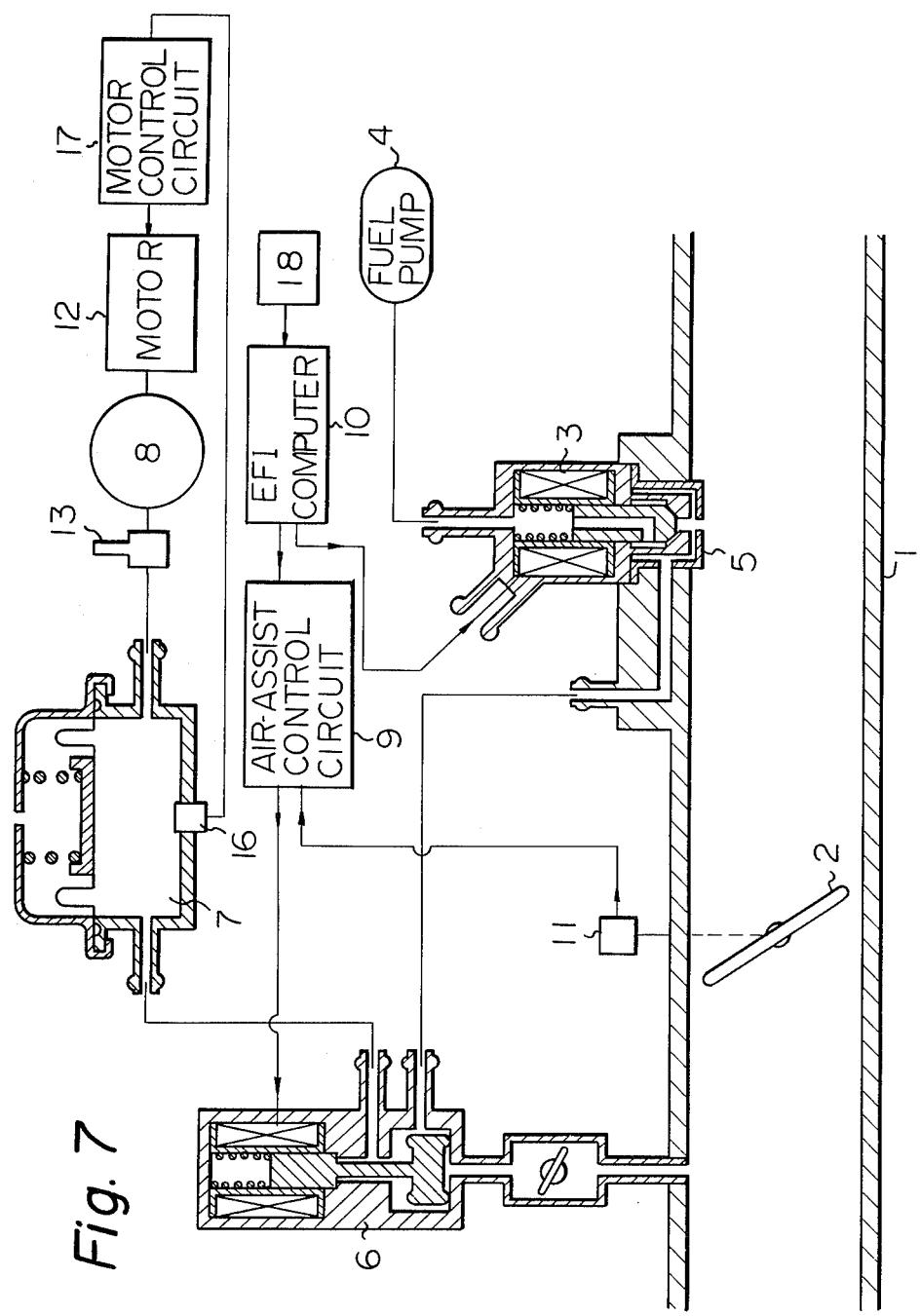
FIG. 7 is a schematic diagram showing the consitution of another modified example of a device for atomizing the fuel for an internal-combustion engine.
Figure 8:
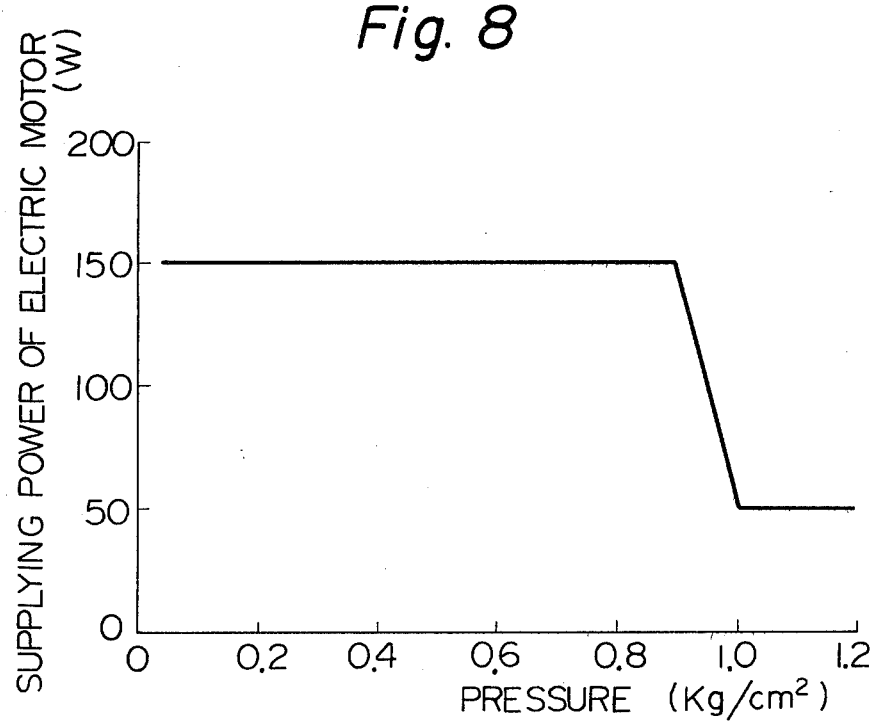
FIG. 8 is a graph showing the relation between the detected pressure value of the pressure sensor and the supply of electric power for the electric motor in the device of FIG. 7.

In FIG. 7, the lines in the direction of the arrows show an electric signal. The relationship between the detected pressure value from the pressure sensor 16 and the power supplied to the electric motor is illustrated in FIG. 8.

Figure 9:
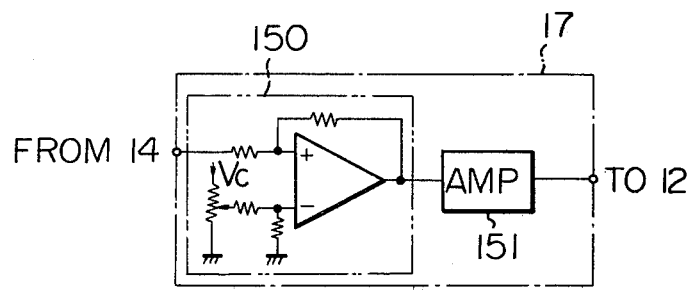
FIG. 9 is a block circuit diagram showing the constitution of the electric motor-control circuit in the device of FIG. 7.

The pressure sensor 16 is made of a semiconductor, having an amplifier circuit inside of the same, and a voltage which becomes higher when the pressure becomes higher and becomes lower when the pressure becomes lower is outputted. In FIG. 9, the circuitry of the electric motor control circuit 17 is shown. This circuit is made to have a hysteresis characteristic by the positive feedback from a comparator 150. A constant voltage corresponding to the predetermined pressure value is set by a variable resistor. When the pressure in the accumulator 7 rises to above the predetermined pressure, the output of the comparator 150 reaches a high level and is amplified through a power amplifier circuit 151 and drives the electric motor 12. The circuitry of the power amplifier circuit 151 is the same as that of the power amplifier circuit 136 in the electric motor control circuit 15 shown in FIG. 1.

In the above-mentioned modified embodiments, when the amount of air necessary for atomizing is detected, the signal of the amount of the air from the EFI computer is used because the amount of air for atomizing is proportional to the amount of air taken in in the internal-combustion engine. Therefore, an additional detecting means is not necessary, and a simplified and precise system is obtained.

The above-mentioned two modified embodiments can be applied in a case in which the electromagnetic air flow-controlling valve is not controlled in such a manner that the injection of air from said air-injection port takes place simultaneously with the injection of fuel from said fuel-injection valve.

We claim:

1. A device for atomizing the fuel for an internal combustion engine comprising:
   a fuel pump,
   an electromagnetic fuel-injection valve connected to said fuel pump,
   an air-injection port adjoining the injection port of said electro-magnetic fuel-injection valve,
   an electromagnetic air flow-controlllng valve connected to said air-injection port, and
   an air pump for feeding air to said air flow-controlling valve,
   wherein said air flow-controlling valve is controlled in such a manner that the injection of air from said air-injection port takes place simultaneously with the injection of fuel from said fuel-injection valve, and
   wherein said fuel-injection valve is located downstream of the throttle valve in the air-intake manifold, and said air flow-controlling valve is of the three-way type, the first way being connected to said air-injection port, the second way being connected to said air pump, and the third way being connected to a port located upstream of said throttle valve, whereby said three-way valve is adapted to operate so as to choose between the pasage of air from said air pump to said air-injection port and the passage of air from said upstream port to said air-injection port.

2. A device for atomizing the fuel for an internal combustion engine comprising:
   a fuel pump,
   an electromagnetic fuel-injection valve connected to said fuel pump,
   an air-injection port adjoining the injection port of said electro-magnetic fuel-injection valve,
   an electromagnetic air flow-controlling valve connected to said air-injection port, and
   an air pump for feeding air to said air flow-controlling valve,
   wherein said air flow-controlling valve is controlled in such a manner that the injection of air form said air-injection port takes place simultaneously with the injection of fuel from said fuel-injection valve,
   means for detecting the amount of air taken in,
   a pressure-accumulating vessel located between said air pump and said air flow-controlling valve,
   a computer circuit for producing a signal corresponding to the amount of air taken in, and
   an electric motor control circuit responsive to the signal produced in said computer circuit for producing the signal for controlling the motor for driving said air pump, whereby the driving power of said air pump is controlled in accordance with the amount of air taken in, and
   wherein said internal-combustion engine further comprises a means for detecting the ratio of the time during which said electro-magnetic air flow-controlling valve is open to one revolution of the crank shaft of said internal-combustion engine, whereby the driving power of said air pump is controlled in accordance with said detected ratio.

3. A device for atomizing the fuel for an internal combustion engine comprising:
   a fuel pump,
   an electromagnetic fuel-injection valve connected to said fuel pump,
   an air-injection port adjoining the injection port of said electro-magnetic fuel-injection valve,
   an electromagnetic air flow-controlling valve connected to said air-injection port,
   an air pump for feeding air into said air flow-controlling valve,
   a means for detecting the amount of air taken in,
   a pressure-accumulating vessel located between said air pump and said air flow-controlling valve,
   a computer circuit for producing a signal corresponding to the amount of air taken in, and
   an electric motor-control circuit responsive to the signal produced in said computer circuit for producing the signal for controlling the motor for driving said air pump, whereby the driving power of said air pump is controlled in accordance wit the amount of air taken in, and wherein said internal-combustion engine further comprises a means for detecting the ratio of the time during which said electro-magnetic air flow-controlling valve is open to one revolution of the crank shaft of said internal-combustion engine makes one rotation, whereby the driving power of said air pump is controlled in accordance with said detected ratio.

4. A device as defined in claim 1, wherein said three-way valve is adapted to operate in such a manner that the passage of air from said air pump to said air-injection port does not occur when said throttle valve is in the completely closed state and the negative pressure of said air-intake manifold is greater than a predetermined pressure based on the signals obtained from the detectors for the degree of opening of said throttle valve and the negative pressure of said air intake manifold.

5. A device as defined in claim 1, wherein said internal-combustion engine further comprises a means for detecting the amount of air taken in, a pressure-accumulating vessel located between said air pump and said air flow-controlling valve, a computer circuit for producing a signal corresponding to the amount of air taken in, and an electric motor control circuit responsive to the signal produced in said computer circuit for producing the signal for controlling the motor for driving said air pump, whereby the driving power of said air pump is controlled in accordance with the amount of air taken in.

6. A device as defined in claim 2, wherein said internal-combustion engine further comprises a means for detecting the pressure value in said pressure-accumulating vessel, whereby the driving power of said air pump is controlled in accordance with the high or low of the ratio of a predetermined value to said detecting pressure value by said detection means.

7. A device as defined in claim 2, wherein the control of the motor for driving said air pump is carried out in such a manner that the electric power supplied to said motor is proportional to the amount of air taken in.

8. A device as defined in claim 3, wherein the control of the motor for driving said air pump is carried out in such a manner that the electric power supplied to said motor is proportional to the amount of air taken in.

9. A device as defined in claim 5 further comprising means for detecting the pressure value in said pressure-accumulating vessel, whereby the driving power of said air pump is controlled in accordance with the high or low of the ratio of a predetermined value to said detecting pressure value by said detection means.

10. A device as defined in claim 5, wherein the control of the motor for driving said air pump is carried out in such a manner that the electric power supplied to said motor is proportional to the amount of air taken in.

* * * * *